United States Patent [19]

Göthberg et al.

[11] Patent Number: 5,636,950
[45] Date of Patent: Jun. 10, 1997

[54] SPINDLE ARRANGEMENT

[75] Inventors: Sven Göthberg; Hans Wendeberg, both of Frölunda, Sweden

[73] Assignee: Aktiebolaget SKF, Gothenburg, Sweden

[21] Appl. No.: 577,339

[22] Filed: Dec. 22, 1995

[30] Foreign Application Priority Data

Dec. 22, 1994 [SE] Sweden .................................. 9404463

[51] Int. Cl.⁶ ........................................................ B23C 1/02
[52] U.S. Cl. ............................................... 409/231; 409/233
[58] Field of Search .................................. 409/231, 232, 409/233

[56] References Cited

U.S. PATENT DOCUMENTS

| | | | |
|---|---|---|---|
| 2,755,117 | 7/1956 | Armitage | 409/231 |
| 3,138,997 | 6/1964 | Bruckner | 409/233 |
| 3,481,248 | 12/1969 | Engstrom | 409/233 |
| 3,893,371 | 7/1975 | Frazier | 409/231 |
| 4,026,191 | 5/1977 | Blomquist | 409/233 |

FOREIGN PATENT DOCUMENTS

| | | | |
|---|---|---|---|
| 1 197 727 | 7/1965 | Germany . | |
| 289226 | 4/1991 | Germany | 409/231 |

*Primary Examiner*—Daniel W. Howell
*Attorney, Agent, or Firm*—Burns, Doane, Swecker & Mathis, L.L.P.

[57] ABSTRACT

A spindle arrangement such as a machine tool spindle which rotates at high rotational speeds includes separate elements, which may be in the form of a counter-weight and a driving and positioning shoulder, that are mounted on the spindle nose. The separate elements are secured to the spindle nose by locking pins that arranged at an angle to the rotational axis of the spindle nose. During rotation of the spindle nose, centrifugal force gives the locking pins a component force in a direction causing the elements to be wedged and the locking pins to be pressed into the bores.

12 Claims, 1 Drawing Sheet

U.S. Patent
Jun. 10, 1997
5,636,950
FIG. 1
FIG. 2
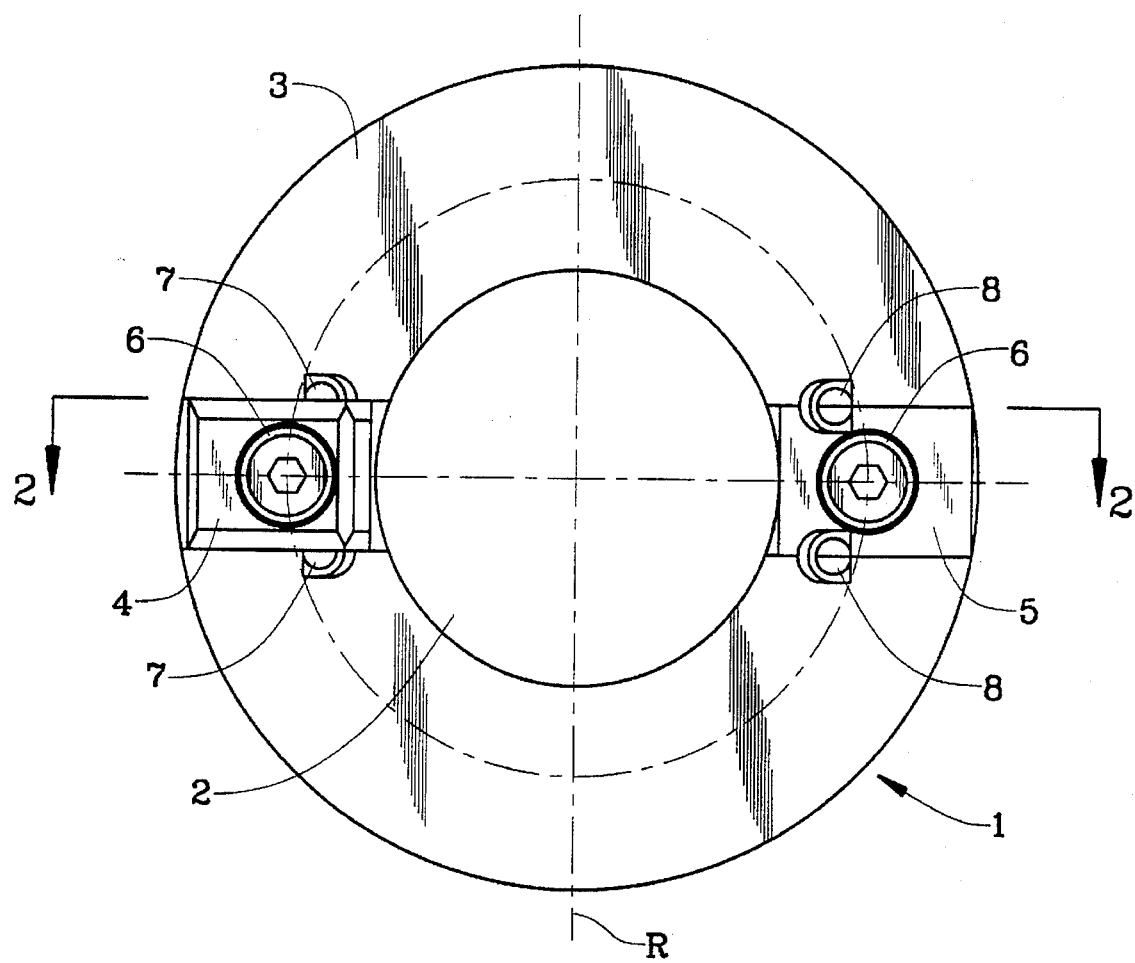
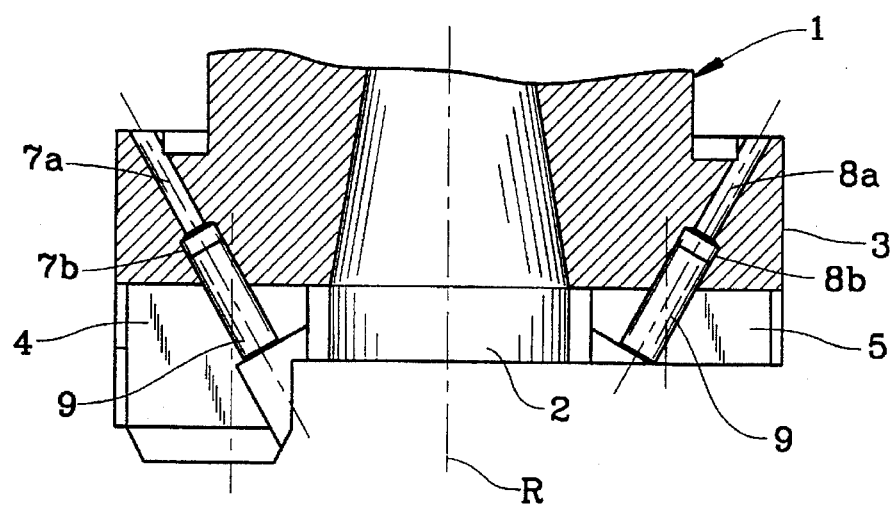

SPINDLE ARRANGEMENT

FIELD OF THE INVENTION

The present invention relates to spindles, e.g. machine tool spindles which operate at high rotational speeds. More particularly, the present invention pertains to such spindles which are equipped with separate elements attached thereto, such as a driving and positioning shoulder and a counter-weight.

BACKGROUND OF THE INVENTION

Traditionally, separate elements such as the driving and positioning shoulder and the counter-weight mentioned above have been fitted to the spindle nose by way of screws which engage axially extending threaded bottom holes in the radial flange of the standardized spindle nose.

In the case of extremely quick-running spindles—up to 20,000 rpm and even more—which today occur for some machine tool applications, the high rotational speed results in centrifugal loads acting on the driving and positioning shoulder and on the counter-weight positioned diametrically opposed thereto. These loads may be so large that the screw joints, due to high bending and shearing stresses, will burst during operation. This can cause the driving and positioning shoulder and the counter-weight to come loose and, due to the very high peripheral speed, be thrown away at very high speed. This presents the potential for serious injuries to personnel and damage to materials.

SUMMARY OF THE PRESENT INVENTION

The present invention is to provide a spindle arrangement which addresses and solves the problems mentioned above while maintaining a standardized spindle nose.

In accordance with one aspect of the invention, a machine tool spindle includes a spindle nose that is rotatable about a rotational axis, a counter-weight mounted on the spindle nose, and a driving and positioning shoulder mounted on the spindle nose. The driving and positioning shoulder is secured to the spindle nose by a first locking pin extending through a first bore provided in the spindle nose, and the counter-weight is secured to the spindle nose by a second locking pin extending through a second bore provided in the spindle nose. The first and second bores are angularly oriented with respect to the rotational axis of the spindle nose so that the bores are other than parallel to the rotational axis of the spindle nose. During rotation of the spindle nose, a component force is imparted to the first and second locking pins by centrifugal force in a direction which causes the counter-weight and the driving and positioning shoulder to be wedged. At the same time, the first locking pin is pressed into the first bare and the second locking pin is pressed into the second bore.

According to another aspect of the invention, a machine tool spindle includes a spindle nose that is rotatable about a rotational axis and an element mounted on the spindle nose and screwed to the spindle nose by a locking pin. The locking pin is positioned in a bore formed in the spindle nose and the bore is angularly oriented with respect to the rotational axis of the spindle nose so that during rotation of the spindle nose, the centrifugal force causes the element to be wedged and the locking pin to be pressed into the bore.

BRIEF DESCRIPTION OF THE DRAWING FIGURES

The invention will be further described with reference to an embodiment shown in the accompanying drawing figures in which like elements are designated by like reference numerals and wherein:

FIG. 1 is an end view of a spindle nose of a machine tool spindle with a driving and positioning shoulder and a counter-weight attached mounted thereon in accordance with the present invention; and FIG. 2 is a cross-sectioned view of the arrangement showing in FIG. 1 taken along the section line II—II in FIG. 1.

DETAILED DESCRIPTION OF THE INVENTION

FIG. 1 depicts an end-view of a spindle nose 1 of a machine tool spindle with a cone 2 and a radial flange 3 situated outside the cone. Attached or secured to the flange 3 is a driving and positioning shoulder 4, and a counter-weight 5 which is positioned diametrically opposed to the driving and positioning shoulder 4. In one respect, the driving and positioning shoulder 4 as well as the counter-weight 5 are both fitted to the flange 3 in a conventional manner by means of respective axially arranged screws 6. In addition, the driving and positioning shoulder 4 as well as the counter-weight 5 are provided with two other bores 7, 8, each provided in the flange 3.

As can be seen in the cross-section through the spindle nose 1 along the section line II—II of FIG. 2, wherein the spindle nose is shown only partially, the two additional bores 7, 8 do not extend axially (i.e., they do not extend parallel to the rotational axis of the spindle nose). Rather, the bores 7, 8 extend at an angle relative to the rotational axis R of the spindle. Consequently, the bores 7, 8 are not oriented parallel to the rotational axis R of the spindle nose. These bores 7, 8 thus have one end located a distance from the rotational axis R of the spindle at the free side or end of the flange 3 and an opposite end disposed at a greater distance from the rotational axis R at the rear side of the flange 3.

Each of the bores 7, 8 preferably incorporates a first through portion 7a, 8a, having a relatively smaller diameter. These first through portions 7a, 8a, which open at the rear side of the flange 3, continue into a relatively larger diameter portion 7b, 8b arranged coaxially with respect to the respective first portion 7a, 8a. These larger diameter portions or second portions 7b, 8b open at the front side of the flange 3, i.e. on the flange side provided with the cone opening. A locking pin 9 is disposed in each of these relatively larger bore portions 7b, 8b. The locking pins 9 are received, preferably under press fit, in the respective bigger bore portions 7b and 8b. The locking pin 9 has a bigger diameter than the respective smaller bore portion 7a and 8a which open at the rear side of the flange 3.

By securing the driving and positioning shoulder 4 and the counter-weight 5 to the spindle nose in this manner, during very quick rotation of the spindle, the locking pins 9 will urge the driving and positioning shoulder 4 and the counter-weight 5 by wedging action harder against the grooves in the spindle nose. This is due to the centrifugal force which arises when the spindle rotates. At the same time, the locking pins 9 will be more firmly pressed into their respective drilled holes 7b and 8b due to the centrifugal force.

Due to this extra locking affect, which increases with higher running speeds of the spindle, the present invention efficiently prevents elements attached to the flange of the spindle from coming loose and being thrown away. By providing bores 7, 8 that extend right through the flange 2, it is possible in a simple manner to dismantle the pins 9 which have been inserted in these bores and which after rotation have been heavily driven thereunto. This can be accomplished by driving them out with a mandrel or a similar tool, which is inserted in the bore straight through the bore portion 7a, 8a with the smaller diameter.

The principles, preferred embodiments and modes of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims be embraced thereby.

What is claimed is:

1. A machine tool spindle comprising a spindle nose that is rotatable about a rotational axis, a counter-weight mounted on said spindle nose, and a driving and positioning shoulder mounted on the spindle nose, said driving and positioning shoulder being secured to the spindle nose by a first locking pin extending through a first bore provided in the spindle nose, said counter-weight being secured to the spindle nose by a second locking pin extending through a second bore provided in the spindle nose, said first and second bores being angularly oriented with respect to the rotational axis of the spindle nose so that during rotation of the spindle nose a component force is imparted to the first and second locking pins by centrifugal force in a direction which causes the counter-weight and the driving and positioning shoulder to be wedged while the first locking pin is pressed into the first bore and the second locking pin is pressed into the second bore.

2. A machine tool spindle according to claim 1, wherein the first locking pin is press fit into the first bore and the second locking pin is press fit into the second bore.

3. A machine tool spindle according to claim 1, wherein said first and second bores are disposed in a radial flange on the spindle nose.

4. A machine tool according to claim 3, wherein said first and second bores each extend completely through the flange, a portion of each of the first and second bores located farthest from the rotational axis of the spindle nose having a smaller diameter than the respective first and second locking pins.

5. A machine tool according to claim 3, wherein said first and second bores extend completely through the flange, a portion of each of the first and second bores located farthest from the rotational axis of the spindle nose having a smaller diameter than a portion of the first and second bores located closer to the rotational axis of the spindle nose.

6. A machine tool spindle according to claim 1, wherein said counter-weight and said driving and positioning shoulder are also secured to the spindle nose by an axially arranged screw.

7. A machine tool spindle comprising a spindle nose that is rotatable about a rotational axis, an element mounted on the spindle nose and screwed to the spindle nose by a locking pin, said locking pin being positioned in a bore formed in the spindle nose, said bore being angularly oriented with respect to the rotational axis of the spindle nose so that centrifugal force created during rotation of the spindle nose causes said element to be wedged and said locking pin to be pressed into the bore.

8. A machine tool spindle according to claim 7, wherein said element is a counter-weight.

9. A machine tool spindle according to claim 7, wherein said element is a driving and positioning shoulder.

10. A machine tool spindle according to claim 7, wherein said bore is disposed in a radial flange of the spindle nose.

11. A machine tool spindle according to claim 7, wherein said element is also secured to the spindle nose by a screw disposed parallel to the rotational axis of the spindle nose.

12. A machine tool according to claim 7, wherein said bore extends completely through the flange, a portion of the bore located farthest from the rotational axis of the spindle nose having a smaller diameter than a portion of the bore located closer to the rotational axis of the spindle nose.

* * * * *